United States Patent Office 3,060,038
Patented Oct. 23, 1962

3,060,038
METHOD OF PREPARING DEHYDRATED EGGS
John J. Mancuso, Astoria, and Leonard Z. Raymond, White Plains, N.Y., assignors to General Foods Corporation, White Plains, N.Y., a corporation of Delaware
No Drawing. Filed Aug. 31, 1960, Ser. No. 53,039
7 Claims. (Cl. 99—210)

This invention relates to a new egg product. More particularly, it relates to a novel dehydrated egg characterized by its ability to hydrate to an edible product without further cooking.

As is well known to those skilled-in-the-art, eggs are consumed in large quantity by most consumers. It is also well known that whole eggs have a limited shelf life, typically less than about 14 days. Because of this limited shelf life and because of the desire of the consumer to purchase fresh eggs, considerable care has heretofore been taken to insure that eggs have been fresh at the point of purchase.

The problems of maintaining eggs fresh for any extended period of time have resulted in the past in various attempts to treat eggs in order to attempt to extend their shelf life. Although techniques such as freezing or coating may have been employed, drying or dehydrating of eggs has most commonly been attempted. In the preparation of dried eggs, the eggs are shelled, homogenized, and spray dried. It is well known to those skilled-in-the-art that the drying of eggs in this manner or in any other manner heretofore employed, permits attainment of a dried product which is low in quality.

The so-prepared dehydrated eggs when mixed with water and recooked, do not produce a cooked egg product which more than superficially resembles the product prepared from fresh eggs. It is well known that the products prepared from dried eggs are generally unacceptable to the consumer in all respects, e.g. taste, appearance, consistency, etc. Dried eggs prepared in this manner have found no extensive use other than as a component of mixes such as cake mixes, wherein their undesirable features may be masked.

Dehydrated eggs which have heretofore been prepared have been directly prepared by drying of uncooked eggs as heretofore noted. It has generally been considered that it was not possible to obtain a desired ultimate dried product by drying of cooked eggs because it was felt that the fact that the eggs had been coagulated during cooking would interfere with subsequent rehydration. This conclusion appears to have been based on the fact that scrambled eggs, boiled eggs, fried eggs, or eggs cooked by other techniques apparently do not, under normal conditions, take up any substantial amount of water. Accordingly there has heretofore been no teaching of any technique of dehydrating a cooked egg composition to produce a product which was readily capable of being reconstituted by addition of water to form a desirable reconstituted egg product which was satisfactory to consumers.

It is an object of this invention to prepare a novel dehydrated egg product characterized by its ease of reconstitution and by its ability to form, on rehydration without cooking, a product which is substantially identical to the corresponding product formed from fresh eggs. It is another object of this invention to set forth a technique for making such a product. Other objects will be apparent to those skilled-in-the-art on inspection of the following description.

In accordance with certain of its aspects, the process of this invention for preparing dehydrated eggs comprises blending whole eggs, adding water to said blended eggs to yield diluted eggs having a concentration of 13%–20% solids and preferably 14% to 15% solids, cooking said diluted eggs, cooling said diluted eggs to a temperature below the coagulation temperature of eggs, adding to said cooled mixture uncooked egg in amount less than about 5% by weight of the blended whole eggs, drum drying said mixture, and removing flakes of dehydrated egg from said drum drying operation.

The eggs which may be employed in practice of this invention are preferably fresh, raw, whole eggs which may be less than 14 days old. Although it may be possible to practice the process of this invention with fresh eggs which are greater than 14 days old, it is found that the product produced thereby is less superior; it may tend to have slight-off odor or flavor. Frozen eggs may be employed if desired.

Preferably the raw whole eggs are separated from their shells and blended or homogenized to insure a uniform mixture. Homogenization or blending may be effected in desired equipment. In the laboratory or on a small scale operation, a Waring Blendor may be employed. In larger operations, it may be possible to employ, e.g. a Lightning mixer. The homogenized egg mixture will commonly contain 26% solids and 74% water.

In the preferred embodiment, the egg, preferably as homogenized may be desugared either by fermentation as with yeast, or by enzyme treatment. Fermentation with yeast may include adding 0.25% of commercially available compressed baker's yeast to the eggs, and maintaining the mixture, for example, at 85° F.–90° F. for 150 minutes. Enzyme treatment may be effected, for example, by use of glucose oxidase, typically as disclosed in U.S. Patent 2,744,017.

Typically the pH of eggs which have been desugared, especially by enzyme treatment, may be as low as 6.5–7.0, typically 6.7; and it is a feature of this invention that the pH be raised to 7.4–8.9, preferably 8.0. If this pH modification not be effected, then it may be found that the product egg will be undesirably fibrous, grainy, and straw-like in texture and undesirably dark in color; furthermore, they will not reconstitute to give a product resembling scrambled eggs.

The blended egg may be diluted with 30 to 100 say 74 parts of water per 100 parts of egg to provide a product liquid having a water content of 80%–87%, preferably 85%–86%. If the water content be above 87%, the desired flake is not obtained; if the water content be below about 80%, the product flake may be undesirably coarse.

The so-diluted eggs may then be cooked, preferably by heating to a temperature of at least about 80° C., and preferably 80° C.–100° C. During cooking constant stirring should be effected. The heated egg may coagulate during e.g. 3–6 minutes, preferably 4 minutes, depending on the particular size of the batch.

After cooking is completed, as determined by the fact that the entire mass has reached a temperature of at least about 80° C., the mass may be cooled to below the coagulation temperature of 60° C., and preferably to a temperature of 50° C.–60° C., to say 50° C. To the cooled mixture there may be added raw whole egg in amount less than about 5%, and preferably about 3%, by weight of the original blended whole egg. If the amount of raw egg added be above about 5%, and especially as is rises above about 10%, the quality of the ultimate product is much less, i.e. an undesirably coarse flake may be obtained which on subsequent rehydration is coarse and hard. If the amount of egg added be less than about 3%, the product dried egg will not form in the desired flake form.

The so-prepared mixture may be homogenized and dried. In the preferred embodiment, drying may be effected by drum drying, and preferably at atmospheric pressure. In the preferred embodiment the steam pressure in the drum may be 30 p.s.i.g.–50 p.s.i.g., preferably 50 p.s.i.g. This may correspond to a temperature of 274° F.–298° F., say 298° F. Drum separation of the double drum drier may be 0.002–0.005, preferably 0.003 inch.

The so-prepared product is a light yellow-colored flake which may have a density of 0.08 gram per cc. The product may have a milde egg-like odor with no undesirable off-odors. It is a particular feature of this invention that the product, especially when prepared in accordance with the preferred enzyme desugaring operation, may be stored for an extended period of time without development of non-bland, undesirable odors or tastes. It has been found that it may be possible to store the preferred novel product at 100° F. for over 8 weeks, and this may correspond to 24 weeks or 6 months at 70° F.

The flakes of dehydrated egg may be readily reconstituted by mixing with water to form a product which, without further cooking, resembles cooked scrambled egg. 25–27 grams of the dried egg product may produce a volume of reconstituted product which approximates a helping of two whole eggs, this being effected by reconstituting the 25–27 grams of dried product with 80 ml. of boiling water. Preferably reconstitution may be effected by adding boiling water to the dried egg product. When this is done, the small flakes of dried eggs immediately expand and swell into pieces of egg which resemble cooked, scrambled egg. As the flakes swell, they coalesce and build upon each other to form the curd-like pieces of egg which typify scrambled eggs. A very light stirring of the reconstituted mixture gives a product which is substantially indistinguishable from scrambled eggs prepared from fresh eggs. If desired, flavoring ingredients such as butter or salt may be added to the dried product before or after the addition of water. The so-reconstituted scrambled eggs were found to be the equivalent, in all respects, of cooked scrambled eggs prepared from fresh whole eggs. In comparative tests on numerous occasions, it was found that the consumer believed that scrambled eggs prepared from the dried eggs of this invention were the standard prepared from fresh eggs.

*Example*

In accordance with a specific example of this invention, raw whole eggs were shelled to give 100 parts by weight of egg. This raw whole egg was blended by intimate mixing to give a substantially homogeneous mixture. 0.05 part of a glucose oxidase solution, containing 174 standard Tilden units per ml. were added and the mixture was permitted to stand at 80° F. for 15 hours. At the end of this time, the sugars in the egg may be lowered from about 3% (dry basis) to about 0.1% or less. The pH of the final mixture may be 6.7–6.8. This pH was raised to pH 7.5 by addition of 0.1 N solution of sodium hydroxide.

The desugared egg may be further blended to give a homogeneous mixture. 74 parts of water were added to raise the water content from 74% to a level of 85%. The diluted eggs were cooked while heating by steam to 80° C. over a period of 4 minutes, during which the mass was constantly mixed. At the end of this time, the mass was cooled to 50° C. by contact with a cool water bath.

Three parts by weight of blended raw, whole egg were added to the mixture, and blending was employed to disperse the raw whole egg through the cooked egg. The mixture was then drum dried on a double drum drier having a drum clearance of 0.003 inch, rotating at 20 r.p.m. for a 6 inch drum. Steam pressure in the drums was 50 p.s.i.g. Pressure above the drying eggs was atmospheric pressure.

The product which was removed from the drum was light yellow in color, and was particularly characterized by its flake-like appearance. Each flake may be about 0.003 inch in thickness and have a typical maximum dimension of about 0.25–0.50 inch. It is free of any undesirable odor and can be stored for indefinitely long periods of time.

On addition to 27 parts of the dry cooked egg flake of 80 ml. of boiling water, the flake adsorbs the water and forms curd-like bodies which on light stirring are substantially identical in all respects to scrambled eggs prepared from whole fresh eggs.

It will be apparent to those skilled-in-the-art that although this invention has been described in terms of a specific example, that various modifications may be made thereto which fall within the scope of the following claims.

We claim:

1. The method of preparing dehydrated eggs which comprises removing the shells of whole eggs, blending said whole eggs, adding water to said blended eggs to yield diluted eggs having a concentration of 13%–20% solids, cooking said diluted eggs at a temperature of 80° to 100° C. while continually stirring said blended eggs, cooling said diluted eggs to a temperature below the coagulation temperature of eggs, adding to said cooled mixture about 3 to 5% uncooked egg by weight of the blended whole eggs, drum drying said mixture and removing flakes of dehydrated egg from said drum drying operation.

2. The method of claim 1 wherein said whole eggs are desugared prior to cooking.

3. The method of claim 2 wherein said whole eggs are desugared by treatment with a fermentation reagent selected from the group consisting of yeast and an enzyme.

4. The method of preparing dehydrated eggs which comprises removing shells of whole eggs, blending said whole eggs, adding water to said blended eggs to yield diluted eggs having a concentration of 13%–20% solids, cooking said diluted eggs at a temperature of 80° to 100° C. while continually stirring said blended eggs, adjusting the pH of said eggs to pH 7.4–8.9 prior to said cooking, cooling said diluted eggs to a temperature below the coagulation temperature of eggs, adding to said cooled mixture about 3 to 5% uncooked egg by weight of the blended whole eggs, drum drying said mixture and removing flakes of dehydrated egg from said drum drying operation.

5. The method of claim 4 wherein said pH is adjusted to about 8.

6. The method of preparing dehydrated eggs which comprises removing the shells of whole eggs, blending said whole eggs, adding water to said blended eggs to yield diluted eggs having a concentration of 14%–15% solids, cooking said diluted eggs at a temperature of 80° to 100° C. while continually stirring said blended eggs, cooling said diluted eggs to a temperature below the coagulation temperature of 60° C., adding to said cooled mixture about 3 to 5% uncooked egg by weight of the blended whole eggs, drum drying said mixture and removing flakes of dehydrated egg from said drum drying operation.

7. The method of preparing dehydrated eggs which comprises removing the shells of whole eggs, blending said whole eggs, adding water to said blended eggs to yield diluted eggs having a concentration of 13%–20% solids, cooking said diluted eggs at a temperature of 80° to 100° C. while continually stirring said blended eggs, cooling said diluted eggs to a temperature below the coagulation temperature of eggs, adding to said cooled mixture uncooked egg in amount of about 3% by weight of the blended whole eggs, drum drying said mixture and removing flakes of dehydrated egg from said drum drying operation.

References Cited in the file of this patent

UNITED STATES PATENTS

| | | |
|---|---|---|
| 1,100,973 | Hara | June 23, 1914 |
| 1,818,212 | Epstein et al. | Aug. 11, 1931 |
| 1,891,887 | Clickner | Dec. 20, 1932 |
| 2,796,352 | Forsythe et al. | June 18, 1957 |